(12) United States Patent
Kim et al.

(10) Patent No.: US 9,307,422 B2
(45) Date of Patent: Apr. 5, 2016

(54) METHOD AND APPARATUS FOR PERFORMING A CHANNEL MEASUREMENT THROUGH A RECEIVING END IN A WIRELESS COMMUNICATION SYSTEM

(75) Inventors: Kitae Kim, Anyang-si (KR); Jinyoung Chun, Anyang-si (KR); Sunam Kim, Anyang-si (KR); Jiwon Kang, Anyang-si (KR); Binchul Ihm, Anyang-si (KR); Sungho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 152 days.

(21) Appl. No.: 14/131,097

(22) PCT Filed: Apr. 27, 2012

(86) PCT No.: PCT/KR2012/003298
§ 371 (c)(1),
(2), (4) Date: Jan. 6, 2014

(87) PCT Pub. No.: WO2013/005916
PCT Pub. Date: Jan. 10, 2013

(65) Prior Publication Data
US 2014/0153426 A1  Jun. 5, 2014

Related U.S. Application Data

(60) Provisional application No. 61/505,125, filed on Jul. 7, 2011.

(51) Int. Cl.
*H04W 24/02* (2009.01)
*H04L 5/00* (2006.01)
*H04B 7/14* (2006.01)
*H04B 7/155* (2006.01)

(52) U.S. Cl.
CPC ............... *H04W 24/02* (2013.01); *H04B 7/14* (2013.01); *H04L 5/003* (2013.01); *H04L 5/0023* (2013.01); *H04L 5/0048* (2013.01); *H04L 5/0092* (2013.01); *H04B 7/1555* (2013.01)

(58) Field of Classification Search
None
See application file for complete search history.

(56) References Cited

U.S. PATENT DOCUMENTS

2011/0064159 A1    3/2011  Ko et al.
2011/0170496 A1*   7/2011  Fong et al. .......... 370/329

(Continued)

FOREIGN PATENT DOCUMENTS

KR    10-2010-0062904 A    6/2010
KR    10-2011-0007986 A    1/2011

(Continued)

*Primary Examiner* — Benjamin H Elliott, IV
(74) *Attorney, Agent, or Firm* — Birch, Stewart, Kolasch & Birch, LLP

(57) ABSTRACT

Disclosed is a method for receiving a downlink signal through a receiving end in a wireless communication system. Specifically, the method comprises the steps of: receiving, from a transmitting end, information on at least one antenna port of a reference signal for a control channel and at least one antenna port of a reference signal for a data channel; receiving the control channel on the basis of the reference signal for the control channel; and receiving the data channel on the basis of the reference signal for the control channel and the reference signal for the data channel, wherein the at least one antenna port of the reference signal for the control channel is included in the at least one antenna port of the reference signal for the data channel.

12 Claims, 18 Drawing Sheets

(56) References Cited

U.S. PATENT DOCUMENTS

| | | | |
|---|---|---|---|
| 2011/0211595 A1* | 9/2011 | Geirhofer et al. | 370/478 |
| 2011/0237270 A1 | 9/2011 | Noh et al. | |
| 2012/0113889 A1 | 5/2012 | Noh et al. | |
| 2012/0120905 A1 | 5/2012 | Ko et al. | |
| 2012/0155414 A1 | 6/2012 | Noh et al. | |
| 2012/0155561 A1* | 6/2012 | Seo et al. | 375/260 |
| 2012/0219094 A1* | 8/2012 | Lindoff et al. | 375/316 |
| 2012/0250642 A1* | 10/2012 | Qu et al. | 370/329 |
| 2012/0281554 A1* | 11/2012 | Gao et al. | 370/252 |
| 2013/0039203 A1* | 2/2013 | Fong et al. | 370/252 |
| 2014/0153426 A1* | 6/2014 | Kim et al. | 370/252 |

FOREIGN PATENT DOCUMENTS

| | | |
|---|---|---|
| KR | 10-2011-0017833 A | 2/2011 |
| KR | 10-2011-0029063 A | 3/2011 |
| KR | 10-2011-0030372 A | 3/2011 |
| WO | WO 2010098581 A2 * | 9/2010 |

* cited by examiner

FIG. 2
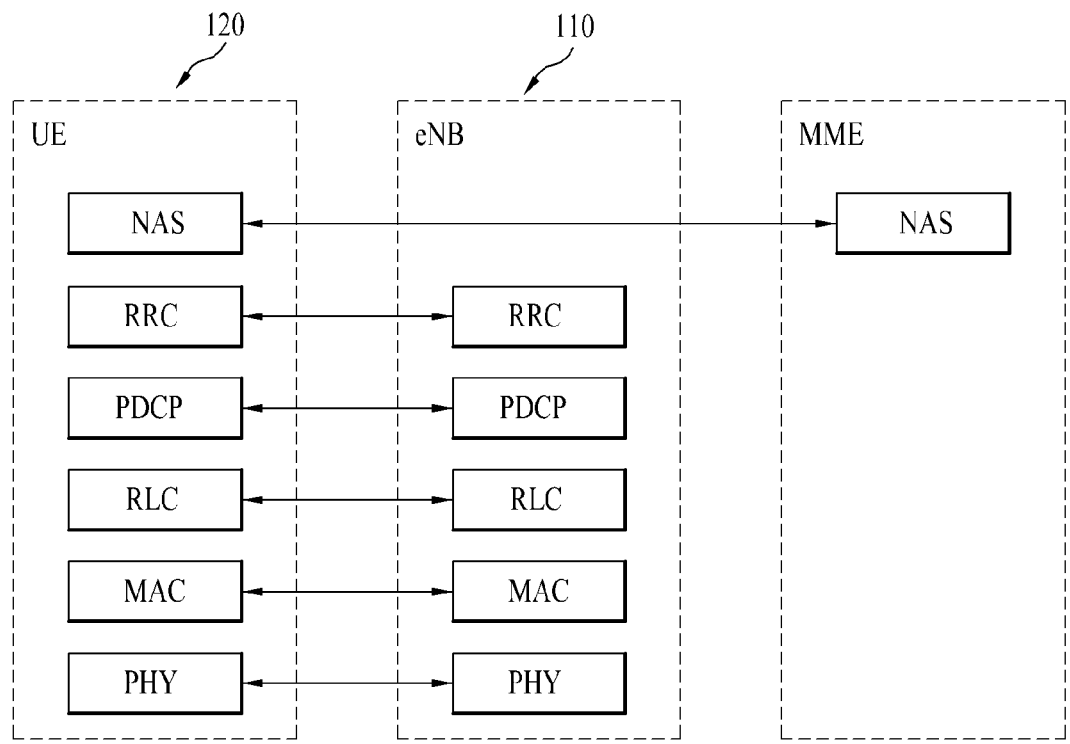
(a) Control-plane protocol stack
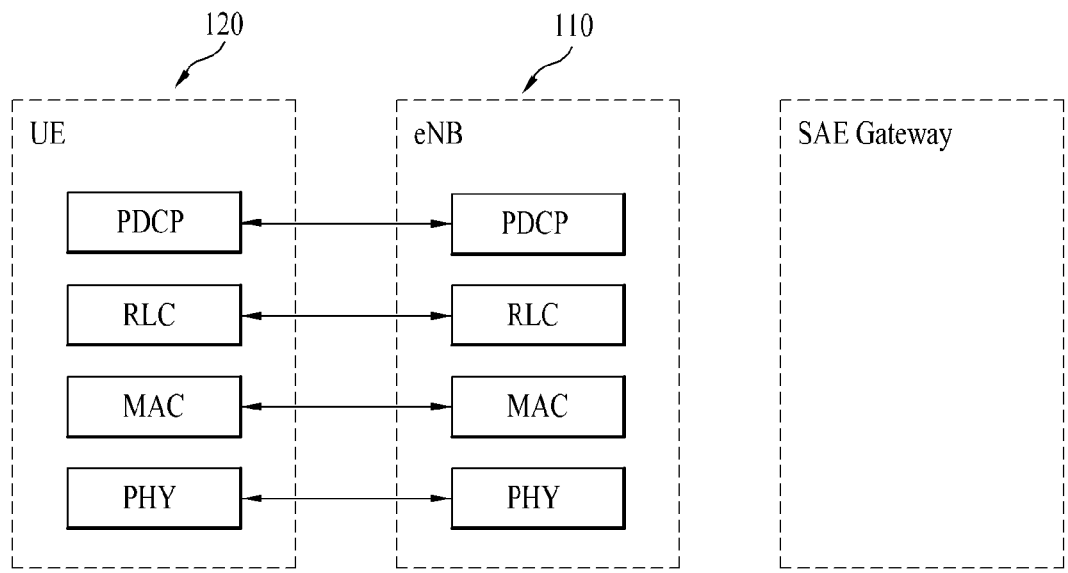
(b) User-plane protocol stack FIG. 6
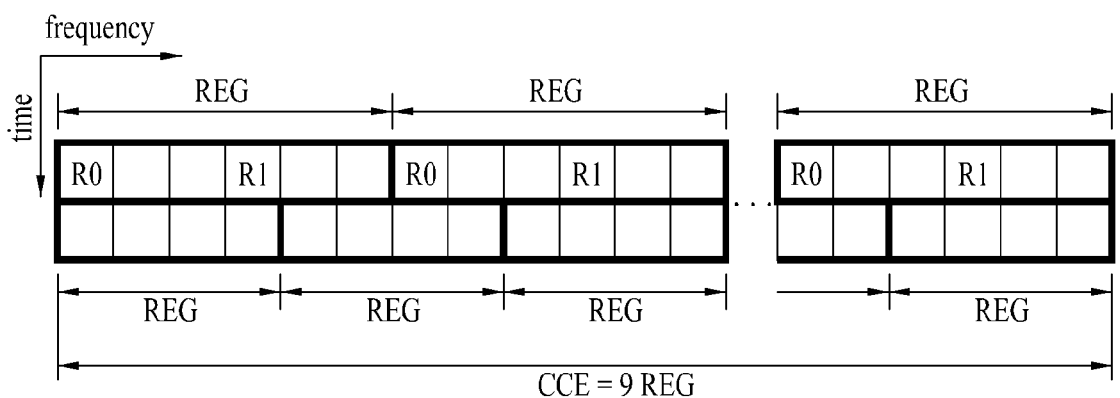
(a) 1 TX or 2 TX
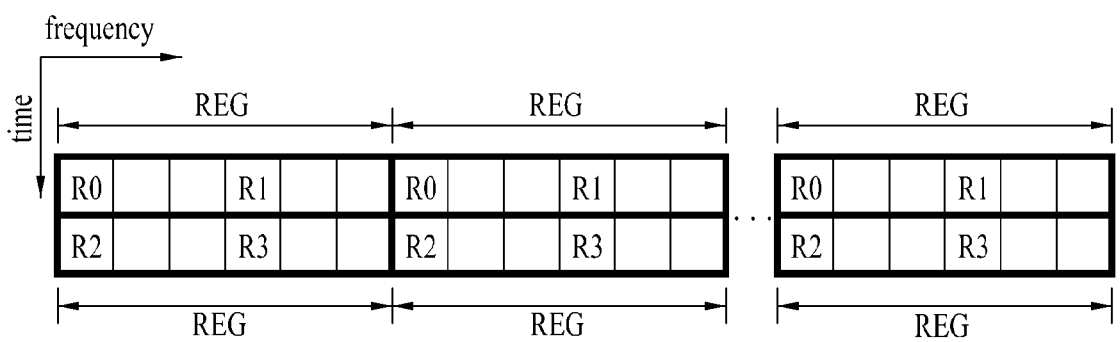
(b) 4 TX ▨ : DMRS Group 1

▧ : DMRS Group 2

METHOD AND APPARATUS FOR PERFORMING A CHANNEL MEASUREMENT THROUGH A RECEIVING END IN A WIRELESS COMMUNICATION SYSTEM

CROSS REFERENCE TO RELATED APPLICATIONS

This application is the National Phase of PCT/KR2012/003298 filed on Apr. 27, 2012, which claims priority under 35 U.S.C. 119(e) to U.S. Provisional Application No. 61/505,125 filed on Jul. 7, 2011, all of which are hereby expressly incorporated by reference into the present application.

TECHNICAL FIELD

The present invention relates to a wireless communication system, and more particularly, to a method for a receiving end to perform a channel measurement in a wireless communication system and apparatus therefor.

BACKGROUND ART

3GPP LTE ($3^{rd}$ generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. To this end, reduction of cost per bit, service availability increase, flexible frequency band use, simple-structure and open interface, reasonable power consumption of user equipment and the like are required.

DISCLOSURE OF THE INVENTION

Technical Task

Based on the above-mentioned discussion, a method for a receiving end to perform a channel measurement in a wireless communication system and apparatus therefor shall be proposed in the following description.

Technical Solution

To achieve these and other advantages and in accordance with the purpose of the present invention, as embodied and broadly described, a method of receiving a downlink signal, which is received by a receiving end in a wireless communication system, according to one embodiment of the present invention includes the steps of receiving information on at least one antenna port of a reference signal for a control channel and at least one antenna port of a reference signal for a data channel from a transmitting end, receiving the control channel based on the reference signal for the control channel, and receiving the data channel based on the reference signal for the control channel and the reference signal for the data channel, wherein the at least one antenna port of the reference signal for the control channel is included in the at least one antenna port of the reference signal for the data channel.

Preferably, the control channel is received in a $1^{st}$ slot of a subframe and the data channel is received in a $2^{nd}$ slot of the subframe or in both of the $1^{st}$ slot and the $2^{nd}$ slot.

Preferably, the data channel receiving step may includes the step of performing a channel measurement using the reference signal for the control channel and the reference signal for the data channel.

Preferably, the number of the at least one antenna port of the reference signal for the control channel is different from the number of the at least one antenna port of the reference signal for the data channel as well as the at least one antenna port of the reference signal for the control channel is included in the at least one antenna port of the reference signal for the data channel.

To further achieve these and other advantages and in accordance with the purpose of the present invention, as embodied and broadly described, a receiving apparatus in a wireless communication system according to another embodiment of the present invention includes a wireless communication module configured to transceive a signal with a transmitting device and a processor configured to process the signal, wherein the wireless communication module receives information on at least one antenna port of a reference signal for a control channel and at least one antenna port of a reference signal for a data channel from a transmitting end, wherein the processor controls the wireless communication module to receive the control channel based on the reference signal for the control channel and receive the data channel based on the reference signal for the control channel and the reference signal for the data channel, and wherein the at least one antenna port of the reference signal for the control channel is included in the at least one antenna port of the reference signal for the data channel.

Advantageous Effects

According to an embodiment of the present invention, a receiving end in a wireless communication can efficiently perform a channel measurement.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram of structures of control and user planes of a radio interface protocol between a user equipment and E-UTRAN based on 3GPP radio access network specification.

FIG. 6 is a diagram of a resource unit used to configure a control channel in an LTE system.

BEST MODE FOR INVENTION

Figure 1:
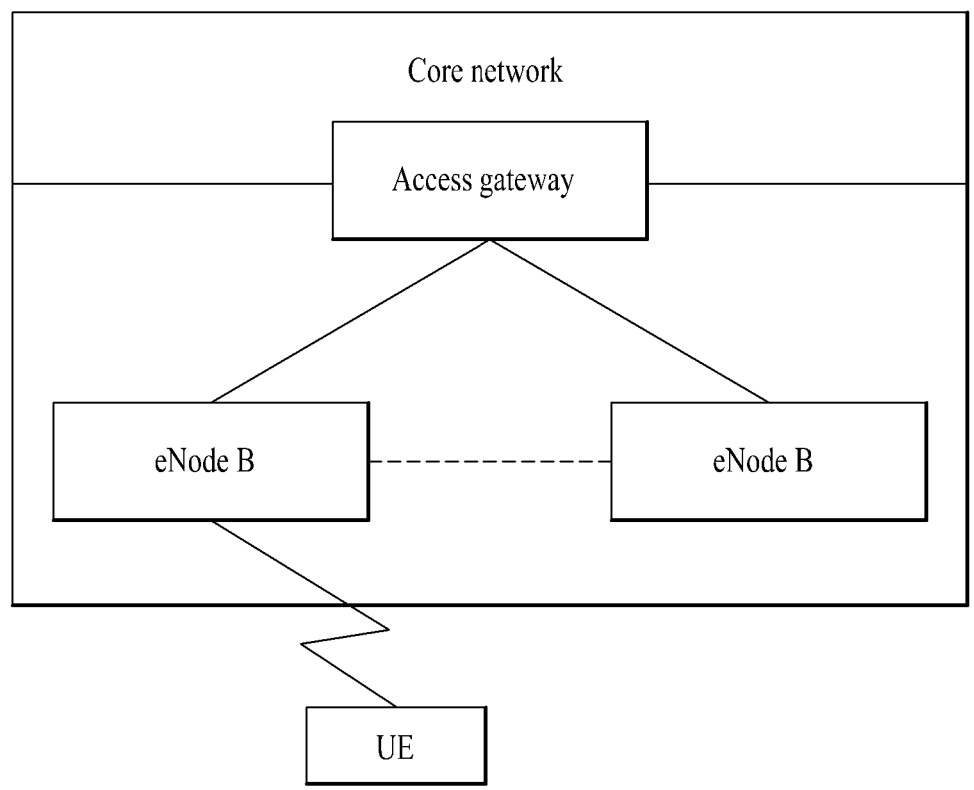
FIG. 1 is a schematic diagram of E-UMTS network structure as an example of a mobile communication system.

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

FIG. 2 is a diagram of structures of control and user planes of a radio interface protocol between a user equipment and E-UTRAN based on 3GPP radio access network specification. First of all, a control plane means a passage for transmitting control messages used by a user equipment and a network to mange a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer of the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. To this end, the RRC layer of the user equipment exchanges RRC messages with the RRC layer of the network. In case that an RRC connection is established between an RRC layer of a user equipment and an RRC layer of a network, the user equipment is in a connected mode. Otherwise, the user equipment is in an idle mode. NAS (non-access stratum) layer above an RRC layer performs a function of session management, a function of mobility management and the like.

One cell, which constructs a base station (eNB), is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH). Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
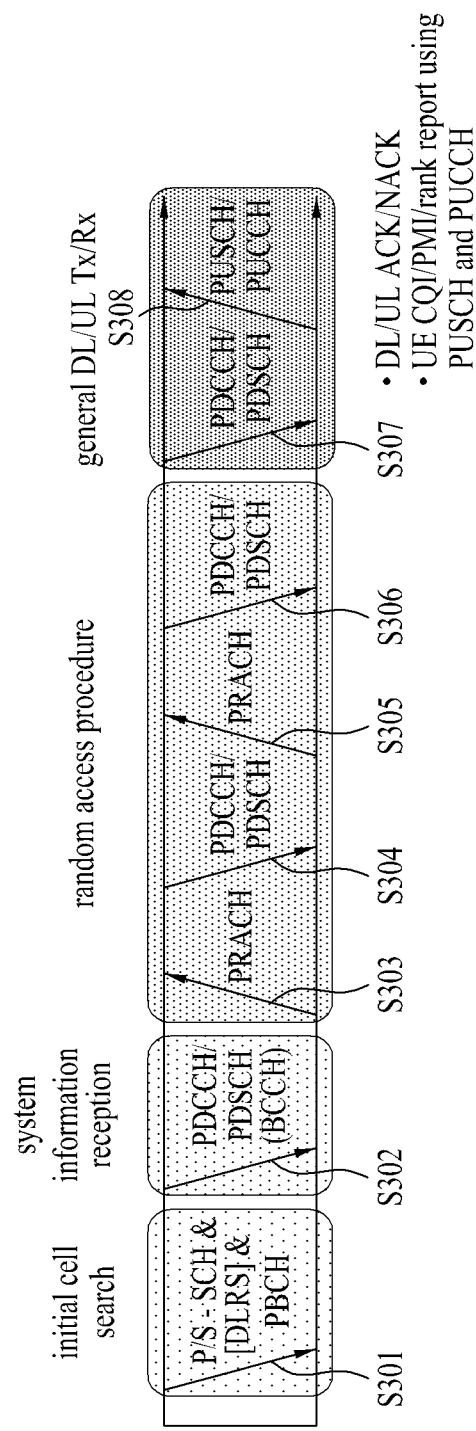
FIG. 3 is a diagram for explaining physical channels used for 3GPP system and a general method of transmitting a signal using the same.

FIG. 3 is a diagram for explaining physical channels used by 3GPP system and a general signal transmitting method using the same.

If a power of a user equipment is turned on or the user equipment enters a new cell, the user equipment performs an initial cell search for matching synchronization with a base station and the like [S301]. To this end, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intracell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. To this end, the user equipment transmits a specific sequence as a preamble via a physical random access channel (PRACH) [S303] and is then able to receive a response message via PDCCH and a corresponding PDSCH in response to the preamble [S304]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

In the following description, MIMO system is explained. First of all, MIMO (multi-input multi-output) is a method that uses a plurality of transmitting antennas and a plurality of receiving antennas. And, this method may be able to improve efficiency in transceiving data. In particular, a transmitting or receiving stage of a wireless communication system uses a plurality of antennas to increase capacity or enhance performance. In the following description, the MIMO may be called 'multiple antennas (multi-antenna)'.

The MIMO technology does not depend on a single antenna path to receive one whole message. Instead, the MIMO technology completes data by putting fragments received via several antennas together. If the MIMO technology is adopted, a data transmission rate within a cell area having a specific size may be improved or a system coverage may be increased by securing a specific data transmission rate. Moreover, this technology may be widely applicable to a mobile communication terminal, a relay and the like. According to the MIMO technology, it may be able to overcome the transmission size limit of the related art mobile communication which used to use a single data.

Figure 4:
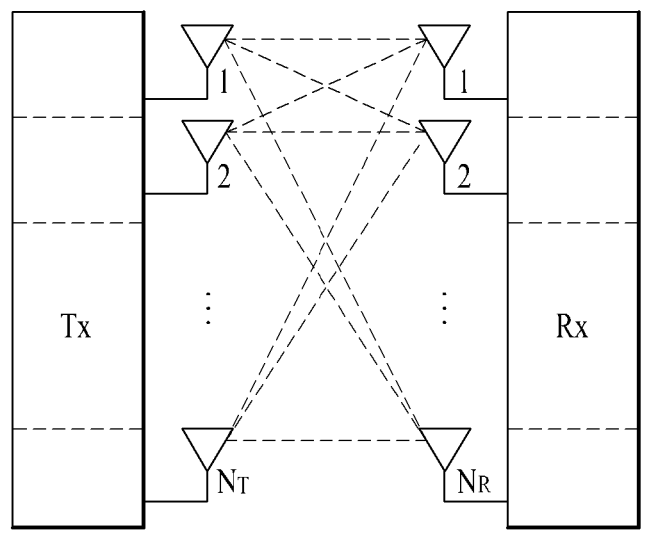
FIG. 4 is a diagram for a configuration of a general multi-antenna (MIMO) communication system.

FIG. 4 is a diagram for a configuration of a multi-antenna (MIMO) communication system explained in the description of the present invention. $N_T$ transmitting antennas are provided to a transmitting stage, while $N_R$ receiving antennas are provided to a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_O$, the transmission rate in case of using multiple antennas may be theoretically raised by a result from multiplying the maximum transmission rate $R_O$ by a rate increasing rate $R_i$, as shown in Formula 1. In this case, $R_i$ is a smaller one of $N_T$ and $N_R$.

$$R_i = \min(N_T, N_R) \qquad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many ongoing efforts are made to various techniques to substantially improve a data transmission rate. And, these techniques are already adopted in part as standards for the 3G mobile communications and various wireless communications such as a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Referring to FIG. 4, assume that $N_T$ transmitting antennas and $N_R$ receiving antennas exist. First of all, regarding a transmission signal, if there are $N_T$ transmitting antennas, $N_T$ maximum transmittable informations exist. Hence, the transmission information may be represented by the vector shown in Formula 2.

$$s = [s_1, s_2, \ldots, s_{N_T}]^T \quad \text{[Formula 2]}$$

Meanwhile, transmission powers can be set different from each other for transmission informations $s_1, s_2, \ldots, s_{N_T}$, respectively. If the transmission powers are set to $P_1, P_2, \ldots, P_{N_T}$, respectively, the transmission power adjusted transmission information can be represented as Formula 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, $\hat{S}$ may be represented as Formula 4 using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Let us consider a case of configuring $N_T$ transmitted signals $x_1, x_2, \ldots, x_{N_T}$, which are actually transmitted, by applying a weight matrix W to a transmission power adjusted information vector $\hat{S}$. In this case, the weight matrix plays a role in properly distributing each transmission information to each antenna according to a transmission channel status and the like. The transmitted signals are set to $x_1, x_2, \ldots, x_{N_T}$ may be represented as Formula 5 using a vector X. In this case, $W_{ij}$ means a weight between an $i^{th}$ transmitting antenna and a $j^{th}$ information. And, the W may be called a weight matrix or a precoding matrix.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Generally, a physical meaning of a rank of a channel matrix may indicate a maximum number for carrying different informations on a granted channel. Since a rank of a channel matrix is defined as a minimum number of the numbers of independent rows or columns, a rank of a channel is not greater than the number of rows or columns. For example by formula, a rank of a channel H (i.e., rank (H)) is limited by Formula 6.

$$\text{rank}(H) \leq \min(N_T, N_R) \quad \text{[Formula 6]}$$

Meanwhile, each different information sent by MIMO technology may be defined as 'transport stream' or 'stream' simply. This 'stream' may be called a layer. If so, the number of transport streams is unable to be greater than a channel rank, which is the maximum number for sending different informations. Hence, the channel matrix H may be represented as Formula 7.

$$\text{\# of streams} \leq \text{rank}(H) \leq \min(N_T, N_R) \quad \text{[Formula 7]}$$

In this case, '# of streams' may indicate the number of stream(s). Meanwhile, it should be noted that one stream is transmittable via at least one antenna.

Various methods for making at least one stream correspond to several antennas may exist. These methods may be described in accordance with a type of MIMO technique as follows. First of all, if one stream is transmitted via several antennas, it may be regarded as spatial diversity. If several streams are transmitted via several antennas, it may be regarded as spatial multiplexing. Of course, such an intermediate type between spatial diversity and spatial multiplexing as a hybrid type of spatial diversity and spatial multiplexing may be possible.

Figure 5:
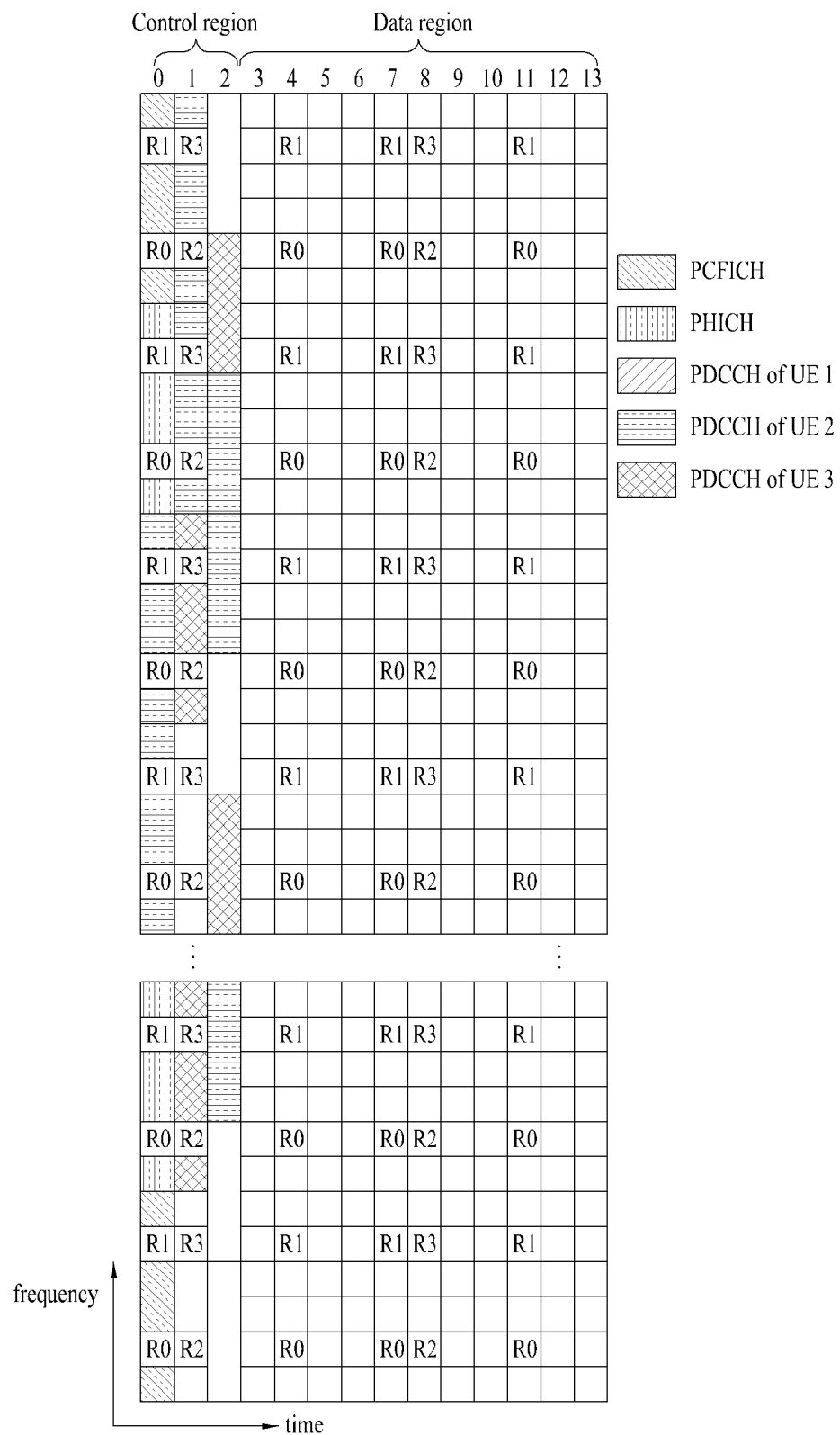
FIG. 5 is a diagram for one example of a structure of a downlink (DL) subframe used by LTE system.

FIG. 5 is a diagram for one example of a control channel included in a control region of a single subframe in a downlink (DL) radio frame.

Referring to FIG. 5, a subframe may include 14 OFDM symbols. First 1 to 3 OFDM symbols may be used as a control region and the rest of 13 to 11 OFDM symbols may be used as a data region, in accordance with subframe configurations. In the drawing, R1 to R4 indicate reference signals (RS) for antennas 0 to 3, respectively. The RS may be fixed to a predetermined pattern in a subframe irrespective of the control region or the data region. The control region may be assigned to a resource, to which the RS is not assigned, in the control region. And, a traffic channel may be assigned to a resource, to which the RS is not assigned, in the data region. Control channels assigned to the control region may include PCFICH (Physical Control Format Indicator CHannel), PHICH (Physical Hybrid-ARQ Indicator CHannel), PDCCH (Physical Downlink Control CHannel) and the like.

The PCFICH is a physical control format indicator channel and informs a user equipment of the number of OFDM symbols used for PDCCH in each subframe. The PCFICH is situated at a first OFDM symbol and is set prior to the PHICH and the PDCCH. The PCFICH is constructed with four resource element groups (REGs). Each of the REGs is distributed within the control region based on a cell ID. One REG is constructed with four REs. In this case, the RE indicates a minimum physical resource defined as '1 subcarrier×1 OFDM symbol'. A value of the PCFICH indicates a value of '1~3' or '2~4' and is modulated by QPSK (quadrature phase shift keying).

The PHICH is a physical HARQ (hybrid-automatic repeat and request) indicator channel and is used in carrying HARQ ACK/NACK for uplink transmission. In particular, the PHICH indicates a channel for carrying DL ACK/NACK information for UL HARQ. The PHICH is constructed with 1 REG and is cell-specifically scrambled. The ACK/NACK is indicated by 1 bit and then modulated by BPSK (binary phase shift keying). The modulated ACK/NACK is spread by 'SF (spreading factor)=2 or 4'. A plurality of PHICHs mapped to the same resource configure a PHICH group. The number of the PHICHs multiplexed into the PHICH group is determined depending on the number of spreading codes. And, the PHICH (group) is repeated three times to obtain a diversity gain in frequency domain and/or time domain.

The PDCCH is a physical downlink control channel and is assigned to first n OFDM symbols of a subframe. In this case, 'n' is an integer equal to or greater than 1 and is indicated by the PCFICH. The PDCCH informs each user equipment or UE group of resource allocation information on transport channels PCH (paging channel) and DL-SCH (downlink-shared channel), uplink scheduling grant, HARQ information and the like. The PCH (paging channel) and the DL-SCH (downlink-shared channel) are carried on the PDSCH. Therefore, a base station or a user equipment normally transmits or receives data via the PDSCH except specific control information or specific service data.

Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency position) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by 'B' and 'C' through the information of the received PDCCH.

FIG. 6 is a diagram of a resource unit used in configuring a control channel in LTE system. In particular, FIG. 6 (a) shows a case that the number of transmitting antenna(s) of a base station is 1 or 2. And, FIG. 6 (b) shows a case that the number of transmitting antennas of a base station is 4. The cases shown in FIG. 6 only differ from each other in RS (reference signal) pattern but have the same method of configuring a resource unit related to a control channel.

Referring to FIG. 6, a basic resource unit of a control channel is REG. The REG includes 4 neighboring resource elements (REs) except RS. The REG is indicated by a bold line in the drawing. PCFICH and PHICH include 4 REGs and 3 REGs, respectively. PDCCH is configured by CCE (control channel elements) unit and one CCE includes 9 REGs.

A user equipment is set to check $M^{(L)}$ ($\geq L$) CCEs, which are contiguous to each other or arranged by specific rules, in order to check whether PDCCH configured with L CCEs is transmitted to the corresponding user equipment. The L value, which should be considered by the user equipment for PDCCH reception, may become a plural number. CCE sets, which should be checked by the user equipment for the PDCCH reception, are called a search space. For instance, LTE system defines a search space as Table 1.

TABLE 1

| Type | Search space $S_k^{(L)}$ | | Number of PDCCH candidates $M^{(L)}$ | DCI formats |
| --- | --- | --- | --- | --- |
| | Aggregation level L | Size [in CCEs] | | |
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

In Table 1, CCE aggregation level L indicates the number of CCEs configuring PDCCH, $S_k^{(L)}$ indicates a search space of the CCE aggregation level L, and $M^{(L)}$ indicates the number of PDCCH candidates supposed to be monitored in the search space of the aggregation level L.

The search space may be categorized into a UE-specific search space accessible by a specific user equipment only and a common search space accessible by all user equipments in a cell. A user equipment monitors a common search space having a CCE aggregation level set to 4 or 8 and a UE-specific search space having a CCE aggregation level set to 1, 2, 4 or 8. And, the common search space and the UE-specific search space may overlap each other.

A position of a $1^{st}$ CCE (i.e., CCE having a smallest index) in PDCCH search space given to a random user equipment for each CCE aggregation level value may vary in each subframe according to a user equipment. This may be called a PDCCH search space hashing.

Figure 7:
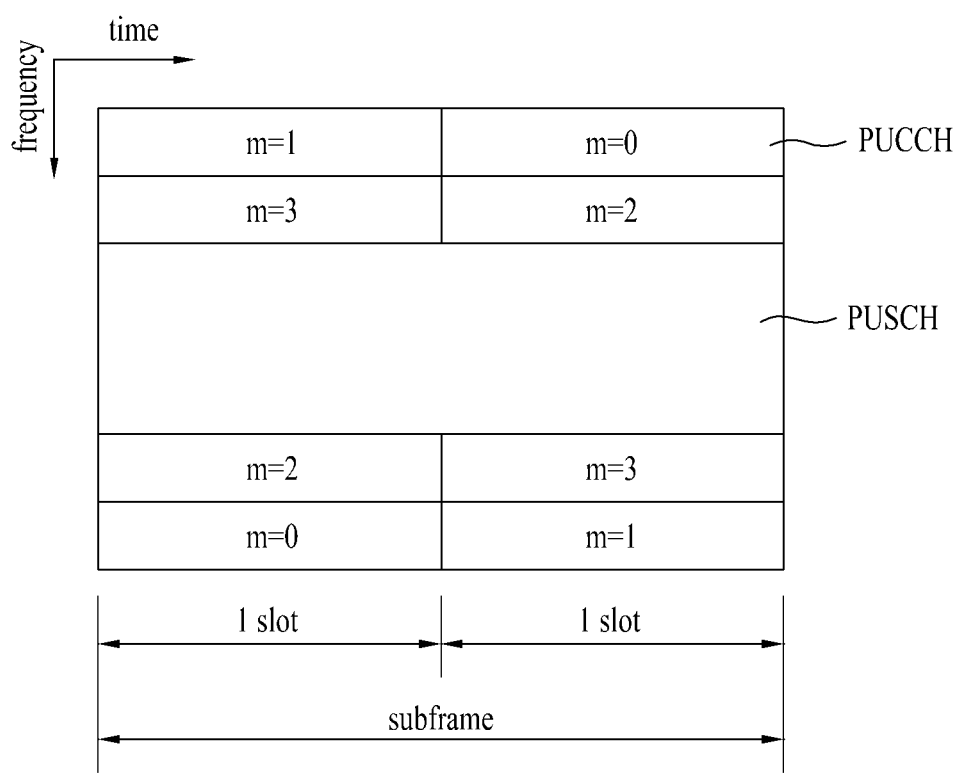
FIG. 7 is a diagram for one example of a structure of an uplink (UL) subframe used in an LTE system.

FIG. 7 is a diagram for one example of a structure of an uplink (UL) subframe used by LTE system.

Referring to FIG. 7, a UL subframe may be divided into a region for assigning PUCCH (physical uplink control channel) configured to carry control information and a region for assigning PUSCH (physical uplink shared channel) configured to carry user data. A middle part of a subframe is assigned to the PUSCH and both side parts of a data region in frequency domain are assigned to the PUSCH. The control information carried on the PUCCH may include ACK/NACK used for HARQ, CQI (channel quality indicator) indicating a DL Channel state, an RI (rank indicator) for MIMO, an SR (scheduling request) that is a UL resource allocation request, and the like. The PUCCH for a single user equipment uses a single resource block occupying a different frequency in each slow within a subframe. In particular, a pair of resource blocks assigned to the PUCCH experience frequency hopping on a slot boundary. Specifically, FIG. 7 shows one example that PUCCH (m=0), PUCCH (m=1), PUCCH (m=2), and PUCCH (m=3) are assigned to the subframe.

Meanwhile, if a channel status between a base station and a user equipment is poor, a relay node (RN) is installed between base station and the user equipment in order to provide a radio channel having a better channel status to the user equipment. In addition, a relay node is introduced to a cell edge region having a poor channel status to provide a high-speed data channel and to extend a cell service area. Thus, the relay node is being widely used to resolve the problem of the propagation shade region in a wireless communication system.

Compared to the conventional relay node having a restricted function of a repeater capable of amplifying and transmitting a signal, the latest relay node technology is being developed to cover more intelligent functions. Moreover, the relay node technology is the technology mandatory to reduce the cost requisite for establishing more base stations and the maintenance cost of a backhaul network in the next generation mobile communication system, to extend the service coverage, and to raise a data processing rate. As the relay node technology tends to be further developed, the necessity for a relay node used in the conventional wireless communication system to be supported by the new wireless communication system is rising correspondingly.

As a relay node is introduced to play a role in forwarding a link connection between a base station and a user equipment in 3GPP LTE-A (3rd generation partnership project long term evolution-advanced) system, two kinds of links differing from each other in attributes are applied to a UL carrier frequency band and a DL carrier frequency band, respectively. A connection link part established between the base station and the relay node may be represented by being defined as a backhaul link. If a transmission is performed by FDD (Frequency Division Duplex) or TDD (Time Division Duplex) using a downlink resource, it may be represented as a backhaul downlink. If a transmission is performed by FDD or TDD using an uplink resource, it may be represented as a backhaul uplink.

Figure 8:
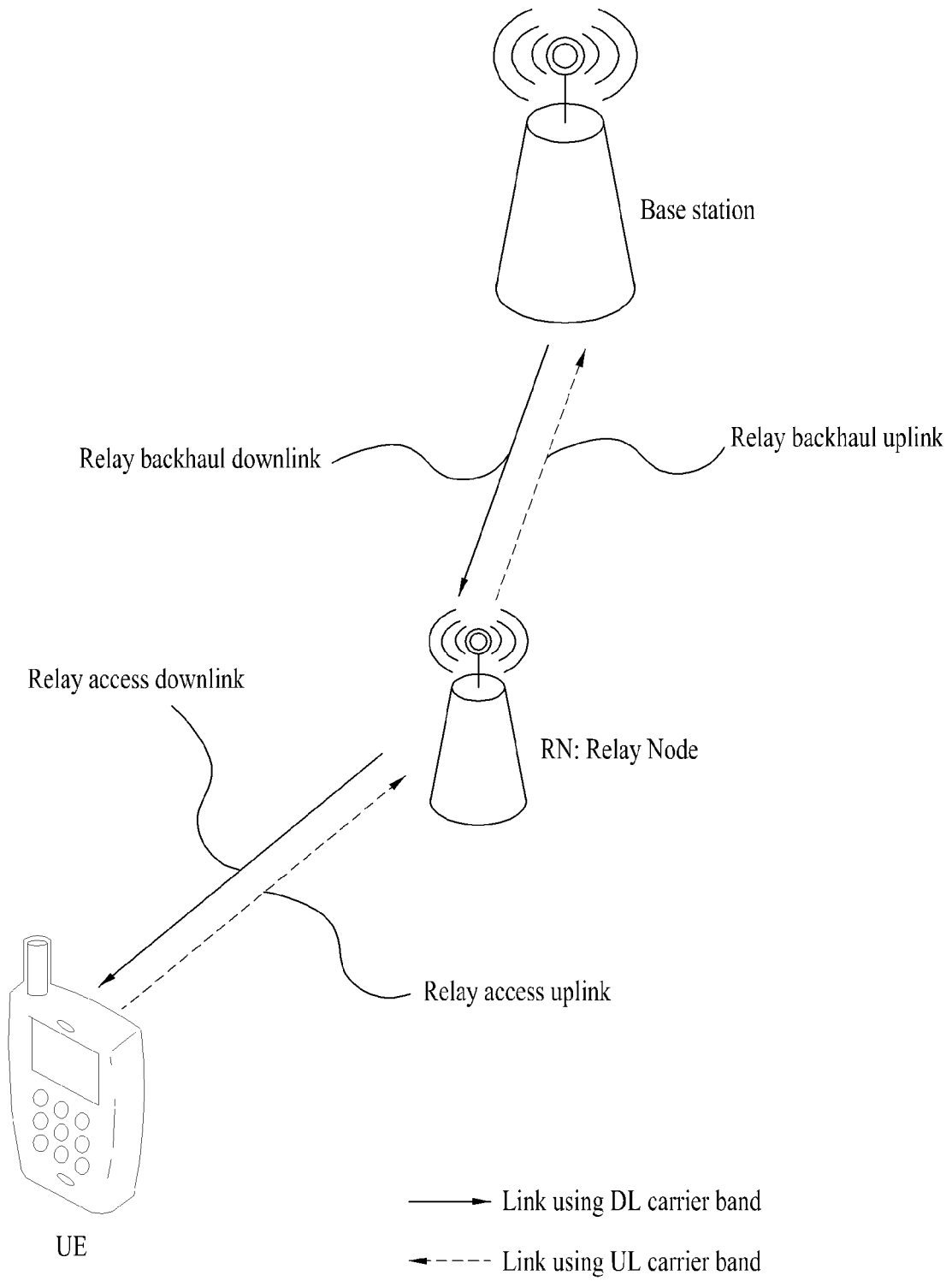
FIG. 8 is a diagram for configurations of a relay backhaul link and a relay access link in a wireless communication system.

FIG. 8 is a diagram for configurations of a relay backhaul link and a relay access link in a wireless communication system.

Referring to FIG. 8, as a relay node is introduced to play a role in forwarding a link connection between a base station and a user equipment, two kinds of links differing from each other in attributes are applied to a UL carrier frequency band and a DL carrier frequency band, respectively. A connection link part established between the base station and the relay node may be represented by being defined into a relay backhaul link. If a transmission is performed in a manner that a backhaul link uses a DL frequency band resource (e.g., the case of Frequency Division Duplex (FDD)) or a DL subframe resource (e.g., the case of Time Division Duplex (TDD)), it may be represented as a backhaul downlink. If a transmission is performed in a manner that a backhaul link uses a UL frequency band resource (e.g., the case of FDD) or a UL subframe resource (e.g., the case of TDD), it may be represented as a backhaul uplink.

On the other hand, a connection link part established between a relay node (RN) and a series of user equipments may be represented by being defined into a relay access link. If a transmission is performed in a manner that the relay access link uses a downlink frequency band resource (e.g., the case of FDD) or a downlink subframe resource (e.g., the case of TDD), it may be represented as an access downlink. If a transmission is performed in a manner that the relay access link uses an uplink frequency band resource (e.g., the case of FDD) or an uplink subframe resource (e.g., the case of TDD), it may be represented as an access uplink.

A relay node (RN) can receive information from a base station in a relay backhaul downlink and is able to transmit information to the base station in a relay backhaul uplink. In addition, the relay node can transmit information to the user equipment in a relay access downlink or is able to receive information from the user equipment in a relay access uplink.

Meanwhile, regarding a use of a band (or spectrum) of a relay node, one case in which a backhaul link operates on the same frequency band of an access link may be referred to as 'in-band', and the other case in which a backhaul link operates on a frequency band different from that of an access link is referred to as 'out-band'. In both of the above-mentioned two cases of the in-band and the out-band, it is necessary for a user equipment (hereinafter named a legacy user equipment) operating in a legacy LTE system (e.g., Release-8) to access a donor cell.

Relay nodes may be classified into a transparent relay node and a non-transparent relay node by depending on whether a user equipment recognizes the relay node. In particular, the 'transparent' may mean a case that a user equipment is unable to recognize whether the user equipment communicates with a network through a relay node. And, the 'non-transparent' may mean a case that a user equipment is able to recognize whether the user equipment communicates with a network through a relay node.

Regarding controls of a relay node, relay nodes may be classified into one relay node configured as a part of a donor cell and another relay node capable of controlling a cell by itself.

Although the relay node configured as a part of the donor cell may have a relay node identifier (ID), the relay node does not have a cell identity of its own. If at least one portion of RRM (Radio Resource Management) is controlled by a base station having the donor cell belong thereto (despite that the rest of the RRM is located at the relay node), the above-mentioned relay node may be considered as a relay node (RN) configured as a part of the donor cell. Preferably, this relay node can support a legacy user equipment. For example, smart repeaters, decode-and-forward relays, various species of L2 ($2^{nd}$ layer) relay nodes, and type-2 relay nodes may correspond to the above-mentioned relay nodes.

Regarding a relay node configured to self-control a cell, this relay node controls one or more cells, a unique physical layer cell identity is provided to each cell controlled by the relay node, and the same RRM mechanism may be usable. In aspect of a user equipment, there is no difference between accessing a cell controlled by a relay node and accessing a cell controlled by a general base station. Preferably, a cell controlled by the above-mentioned relay node may be able to support a legacy user equipment. For example, a self-backhauling RN, an L3 ($3^{rd}$ layer) relay node, a type-1 relay node, and a type-1a relay node may correspond to the above-mentioned relay nodes.

The type-1 relay node plays a role as an in-band relay node in controlling a plurality of cells, and a user equipment may consider each of the cells as a separate cell discriminated from a donor cell. Moreover, each of a plurality of the cells has a physical cell ID (defined in LTE Release-8) of its own and the relay node may transmit a synchronization channel of its own, a reference signal and the like. In case of a single-cell operation, a user equipment may directly receive scheduling information and HARQ feedback from a relay node and may transmit a control channel (scheduling request (SR), CQI, ACK/NACK, etc.) of its own to a relay node. Moreover, legacy user equipments (e.g., user equipments operating in LTE Release-8 system) may consider the type-1 relay node as a legacy base station (e.g., a base station operating in the LTE Release-8 system). In particular, the type-1 relay node has backward compatibility. Meanwhile, in aspect of user equipments operating in LTE-A system, the type-1 relay node is considered as a base station different from a legacy base station, whereby performance thereof can be enhanced.

The type-1a relay node is operated in the out-band, and has the same features as those of the type-1 relay node. Operation of the type-1a relay node may be configured to minimize (or eliminate) the influence on L1 ($1^{st}$ layer) operation.

The type-2 relay node corresponds to an in-band relay node but has no separate physical cell ID not to form a new cell. The type-2 relay node is transparent to a legacy user equipment and the legacy user equipment is unable to recognize the presence of the type-2 relay node. Although the type-2 relay node is able to transmit PDSCH, it may not transmit CRS and PDCCH at least.

Meanwhile, in order for a relay node to operate in in-band, prescribed resources in time-frequency space must be reserved for a backhaul link and these resources may be configured not be used for an access link. This configuration may be called 'resource partitioning'.

The general principles related to the resource partitioning in a relay node may be described as follows. First of all, a backhaul downlink and an access downlink may be multiplexed together on a single carrier frequency by Time Division Multiplexing (TDM) [i.e., either the backhaul downlink or the access downlink is activated in specific time.]. Similarly, a backhaul uplink and an access uplink may be multiplexed together on a single carrier frequency by TDM [i.e., either the backhaul uplink or the access uplink is activated in specific time].

Regarding the backhaul link multiplexing by FDD, a backhaul downlink transmission may be described as performed on a downlink frequency band, and a backhaul uplink transmission may be described as performed on an uplink frequency band. Regarding the backhaul link multiplexing by TDD, a backhaul downlink transmission may be described as performed in a downlink subframe of a base station or a relay node, and a backhaul uplink transmission may be described as performed in an uplink subframe of the base station or the relay node.

In case of an in-band relay node, for example, provided that both a backhaul downlink reception from a base station and an access downlink transmission to a user equipment are simultaneously performed on a prescribed frequency band, a signal transmitted from a transmitting end of a relay node may be received by a receiving end of the relay node, whereby signal interference or RF jamming may occur at an RF front-end of the relay node. Similarly, if both an access uplink reception from a user equipment and a backhaul uplink transmission to a base station are simultaneously performed on a prescribed frequency band, signal interference may occur at the RF front-end of the relay node. Therefore, it may be difficult to implement the simultaneous transmission and reception on a single frequency band at a relay node unless a sufficient separation between a received signal and a transmitted signal is provided [e.g., a transmitting antenna and a receiving antenna are installed in a manner of being sufficiently spaced apart from each other (e.g., installed on or under the ground)].

As one solution for the above signal interference problem, a relay node is set not to transmit a signal to a user equipment while receiving a signal from a donor cell. In particular, a gap is generated in a transmission from the relay node to the user equipment, and the user equipment (e.g., a legacy user equipment, etc.) may be configured not to expect any transmission from the relay node during this gap. The above-mentioned gap may be generated by constructing MBSFN (Multicast Broadcast Single Frequency Network) subframe.

Figure 9:
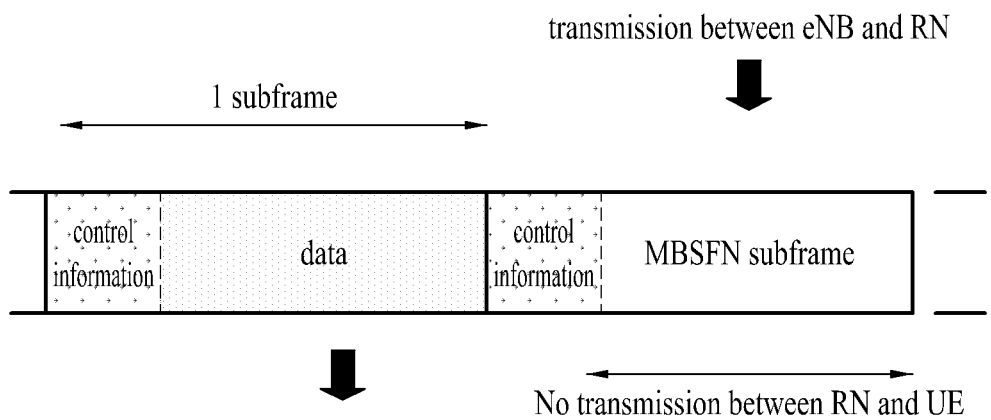
FIG. 9 is a diagram for one example of relay node resource partition.

FIG. 9 is a diagram for one example of relay node resource partitioning.

Referring to FIG. 9, in a first subframe that is a normal subframe, a downlink (i.e., an access downlink) control signal and data are transmitted from a relay node to a user equipment. In a second subframe that is an MBSFN subframe, while a control signal is transmitted from the relay node to the user equipment on a control region of a downlink subframe but any transmission from the relay node to the user equipment is not performed in the rest region of the downlink subframe. In doing so, since a legacy user equipment expects a transmission of physical downlink control channel (PDCCH) in all downlink subframes (i.e., the relay node needs to support legacy user equipments within a coverage of the relay node to receive PDCCH in each subframe and to perform a measurement function thereof), it is necessary for the PDCCH to be transmitted in all the downlink subframes in order for each legacy user equipment to operate correctly. Therefore, in a subframe (e.g., second subframe) configured for a downlink (i.e., backhaul downlink) transmission from a base station to a relay node, the relay node needs to perform an access downlink transmission in first N OFDM symbols (N=1, 2 or 3) rather than to receive a backhaul downlink. To this end, since PDCCH is transmitted from the relay node to the user equipment in a control region of the second subframe, it is able to provide backward compatibility with a legacy user equipment served by the relay node. While no signal is transmitted in the rest region of the second subframe from the relay node, the relay node may be able to receive a transmission from the base station. Therefore, the above-mentioned resource partitioning scheme can prevent the access downlink transmission and the backhaul downlink reception from being simultaneously performed by the in-band relay node.

The second subframe, which uses the MBSFN subframe, shall be described in detail as follows. First of all, a control region of the second subframe may be referred to as a relay node non-hearing interval. In particular, the relay node non-hearing interval may mean the interval in which a relay node transmits an access downlink signal instead of receiving a backhaul downlink signal. As mentioned in the foregoing description, this relay node non-hearing interval may be configured to have 1-, 2- or 3-OFDM length. In the relay node non-hearing interval, a relay node performs an access downlink transmission to a user equipment and may receive a backhaul downlink from a base station in the rest of the relay node non-hearing interval. In doing so, since the relay node is unable to perform both transmission and reception on the same frequency band, it may take a time to enable the relay node to be switched from a transmitting mode to a receiving mode. Hence, it may be necessary to configure a guard time (GT) to enable the relay node to perform a transmitting/receiving mode switching in first partial interval of a backhaul downlink receiving region. Similarly, even if the relay node operates in a manner of receiving a backhaul downlink from the base station and transmitting and access downlink to the user equipment, it may be able to configure a guard time (GT) for the transmitting/receiving mode switching of the relay node. The length of the guard time may be defined as a value in time domain. For example, the length of the GT may be defined as k time samples (Ts) (where, $k \geq 1$) or may be set to the length of at least one or more OFDM symbols. Alternatively, in case that relay node backhaul downlink subframes are contiguously configured or in accordance with a prescribed subframe timing alignment relation, the guard time of a last part of a subframe may be defined or may not configured. In order to maintain backward compatibility, this guard time may be defined only in a frequency domain configured for a backhaul downlink subframe transmission (i.e., a legacy user equipment is not supportable if a guard time is configured in an access downlink interval). In the backhaul downlink receiving interval except the guard time, the relay node may be able to receive relay node dedicated PDCCH and PDSCH from the base station. In the meaning of a relay node dedicated physical channel, the PDCCH and the PDSCH may also be represented as Relay-PDCCH (R-PDCCH) and R-PDSCH (Relay-PDSCH), respectively.

In the following description, reference signals are explained in detail.

First of all, a reference signal already known to both a transmitting side and a receiving side is generally transmitted for channel measurement to the receiving side from the transmitting side together with data. This reference signal is provided for the channel measurement and also indicates a modulation scheme to play a role in enabling a demodulation process. Reference signals can be categorized into a dedicated reference signal (DRS) for a specific user equipment (UE) and a dedicated reference signal for a base station, i.e., a UE-specific reference signal and a common reference signal (common RS or CRS (cell-specific RS) that is a cell-specific reference signal for all user equipments within a cell. Moreover, the cell-specific reference signal includes a reference signal for measuring and reporting CQI/PMI/RI to a base station from a user equipment. And, such a reference signal is called CSI-RS (channel state information-RS).

Figure 10:
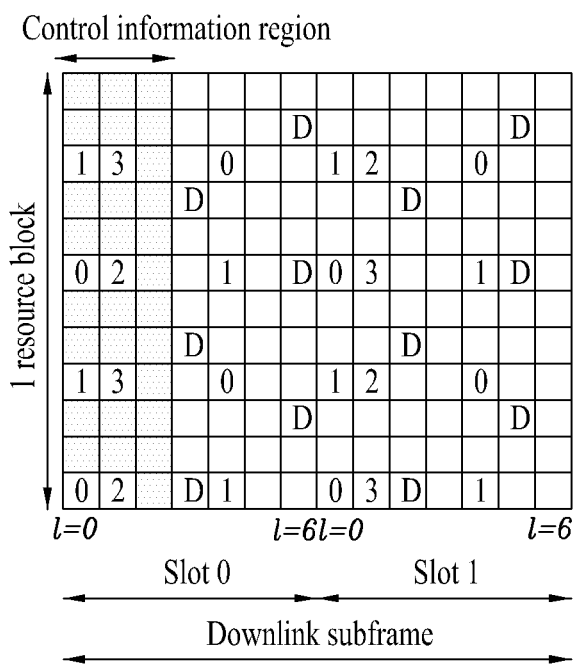
FIG. 10 and FIG. 11 are diagrams for structures of a downlink reference signal in LTE system supportive of a downlink transmission using 4 antennas.
Figure 11:
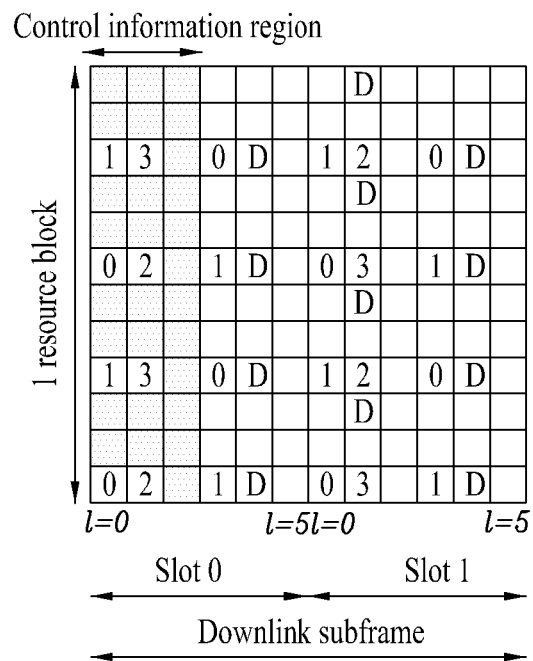

FIG. 10 and FIG. 11 are diagrams for structures of a downlink reference signal in LTE system supportive of a downlink transmission using 4 antennas. Particularly, FIG. 10 shows a case of a normal cyclic prefix and FIG. 11 shows a case of an extended cyclic prefix.

Referring to FIG. 10 and FIG. 11, numerals 0 to 3 entered in a grid correspond to antenna ports 0 to 3 and mean a common reference signal (CRS) that is a cell-specific reference signal transmitted for channel measurement and data demodulation. The cell-specific reference signal CRS can be transmitted to a user equipment across a control information region overall as well as across a data information region.

'D' entered in the grid means a downlink DM-RS (demodulation-RS) that is a UE-specific RS. The DM-RS supports a single antenna port transmission on PDSCH. A user equipment receives a signaling of a presence or non-presence of DM-RS, which is a UE-specific RS, through an upper layer. FIG. 10 and FIG. 11 show examples of DM-RS corresponding to an antenna port 5. In 3GPP standard document 36.211, DM-RS for antenna ports 7 to 14 is defined as well.

Figure 12:
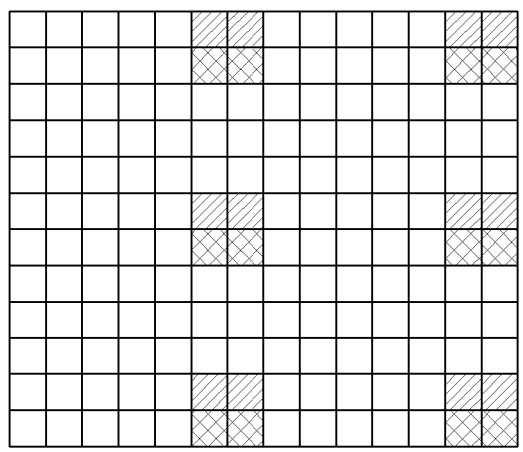
FIG. 12 is a diagram for one example of downlink DM-RS assignment currently defined in 3GPP standard document.

FIG. 12 is a diagram for one example of DM-RS assignment currently defined in 3GPP standard documents.

Referring to FIG. 12, DM-RS corresponding to antenna port {7, 8, 11, 13} is mapped to DM-RS Group 1 using a sequence per antenna port. Likewise, DM-RS corresponding to antenna port {9, 10, 12, 14} is mapped to DM-RS Group 2 using a sequence per antenna port.

Meanwhile, the above-mentioned CSI-RS is proposed for the purpose of channel measurement of PDSCH. Unlike CRS, CSI-RSs can be defined into maximum 32 kinds of different CSI-RS configurations in order to reduce inter-cell interference (ICI) in a multi-cell environment.

Figure 13:
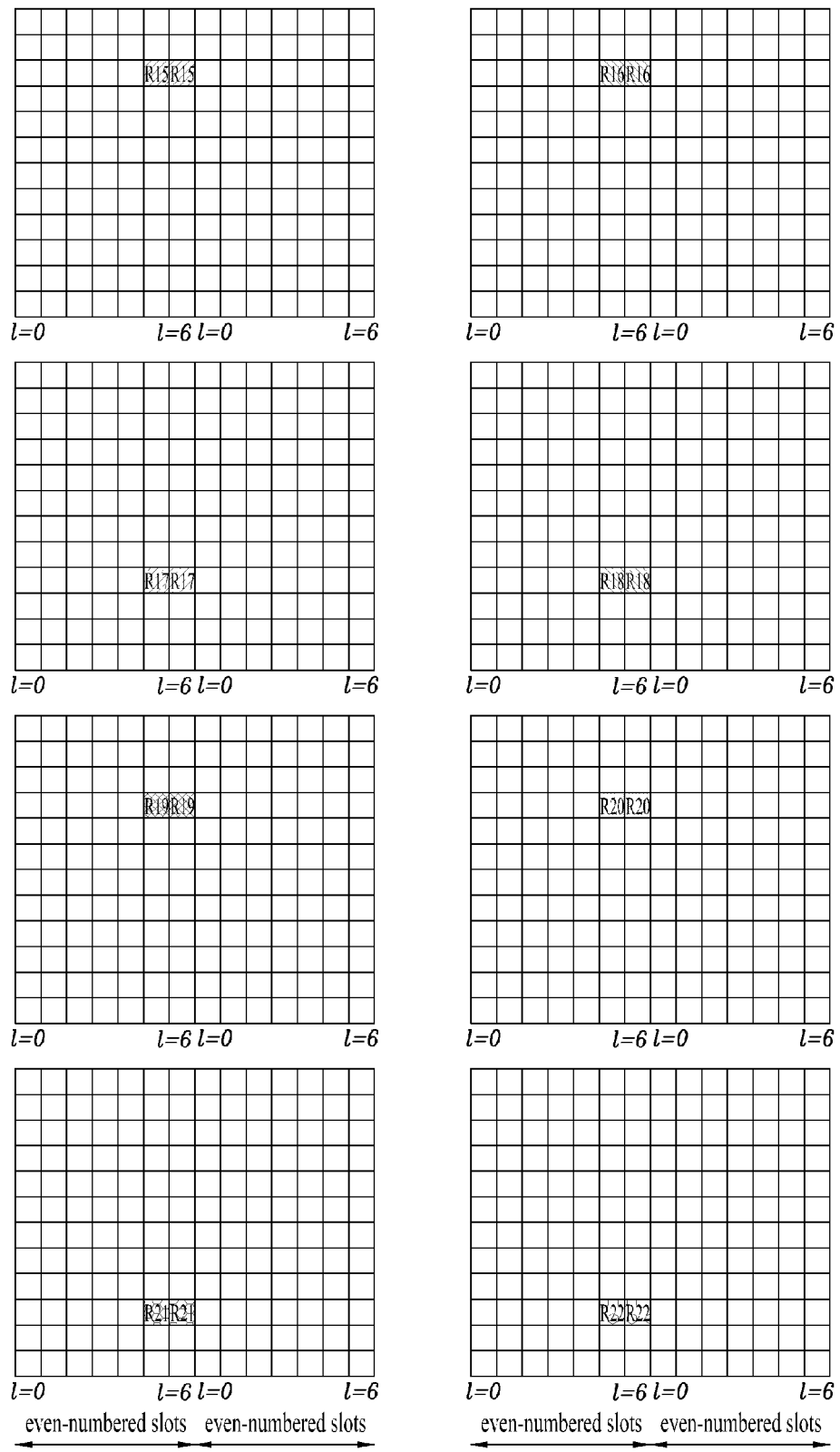
FIG. 13 is a diagram for one example of CSI-RS configuration #0 in case of a normal CP among CSI-RS configurations currently defined by 3GPP standard document.

CSI-RS configurations differ from each other depending on the number of antenna ports. Between neighboring cells, CSI-RS is configured to be transmitted in a manner of being defined to have a CSI-RS configuration as different as possible. Unlike CRS, CSI-RS supports maximum 8 antenna ports. In 3GPP standard document, total 8 antenna ports including antenna ports 15 to 22 are assigned as antenna ports for CSI-RS. FIG. 13 shows one example of CSI-RS configuration #0 in case of a normal CP in the downlink CSI-RS configuration currently defined in 3GPP standard document.

In the current wireless communication environments, the data demand for a cellular network is rapidly increasing due to the M2M (machine-to-machine) communications and the prevalent use of various devices that requires high data throughput. In order to meet the high data demand, the communication technology is evolving into a carrier aggregation technology for using more frequency bands efficiently, a multi-antenna (MIMO) technology for increasing data capacity in limited frequencies, a multiple base station cooperation technology and the like and the communication environment is evolving in a direction for raising density of accessible nodes around a user. A system provided with such nodes in high density can show higher system performance by cooperation among the nodes. According to this system, the nodes operates as independent base station (e.g., a base station (BS), an advances BS (ABS), a Node-B (NB), an eNode-B (eNB), an access point (AP), etc.) to have performance better that in case of not cooperating with each other.

Figure 14:
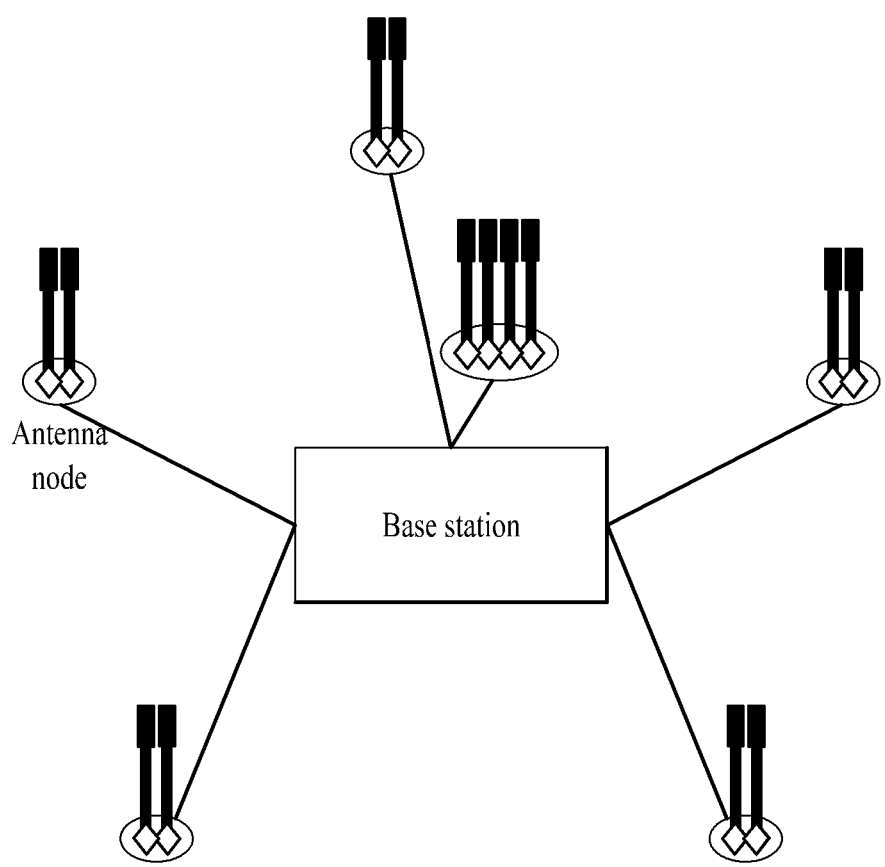
FIG. 14 is a diagram for one example of a multi-node system in a next generation communication system.

FIG. 14 is a diagram for one example of a multi-node system in a next generation communication system.

Referring to FIG. 14, as transmission and receptions of all nodes are managed by a single controller, if each individual node operates a partial antenna group of a single cell, this system can be regarded as a distributed multi-node system (DMNS) that configures a single cell. In this case, each of the individual nodes can receive a separate Node ID and may be able to operate as a partial antenna in a cell without the separate Node ID. Yet, if nodes have different cell identifiers (IDs), such a system can be regarded as a multi-cell system. If these multiple cells are configured in a manner of overlapping each other depending on a coverage, such a configuration can be called a multi-tier network.

Meanwhile, Node-B, eNode-B, PeNB, HeNB, RRH (remote radio head), relay, a distributed antenna and the like can become nodes and at least one antenna is installed on a single node. A node may be called a transmission point. A node generally means an antenna group distant in a predetermined interval or more. Yet, according to the present invention, even if a node is defined as a random antenna group irrespective of an interval, it is applicable to the present invention.

Owing to the introduction of the above-mentioned multi-node system and the above-mentioned relay node, various communication schemes are applicable to channel quality enhancement. Yet, in order to apply the aforementioned MIMO scheme and the inter-cell cooperative communication scheme to the multi-node environment, the introduction of a new control channel is necessary. For this necessity, a control channel discussed for a new introduction is E-PDCCH (Enhanced-PDCCH). And, it has been determined that the 3-PDCCH shall be assigned not to an existing control region (hereinafter named a PDCCH region) but to a data region (hereinafter named a PDSCH region). Therefore, since transmission of control information for a node becomes possible for each user equipment through the E-PDCCH, it is also able to solve the problem that an existing PDCCH region may become insufficient. For reference, e-PDCCH is not provided not to an existing legacy user equipment but can be received by an LTE-A user equipment only.

Figure 15:
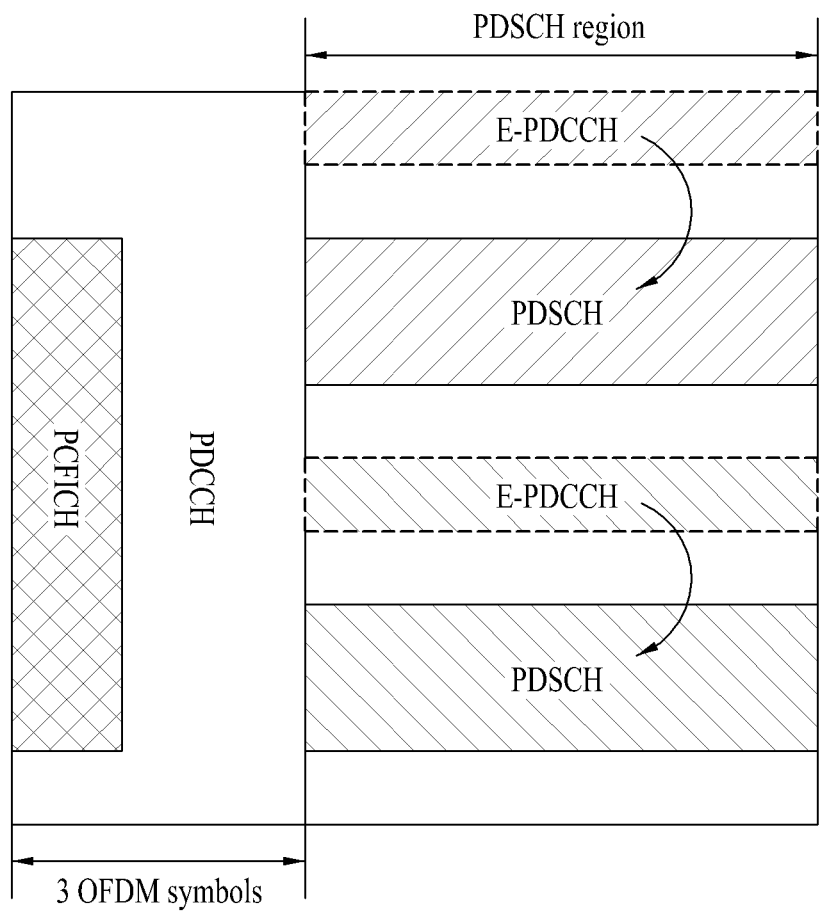
FIG. 15 is a diagram for one example of PDSCH scheduled by E-PDCCH and E-PDCCH.

FIG. 15 is a diagram for one example of PDSCH scheduled by E-PDCCH and E-PDCCH.

Referring to FIG. 15, E-PDCCH can define and use a portion of a PDSCH region for transmitting data in general. And, a user equipment should perform a blind decoding process for detecting a presence or non-presence of E-PDCCH of its own. The E-PDCCH performs the same scheduling operations (i.e., PDSCH control, PUSCH control, etc.) of an existing PDCCH. Yet, if the number of user equipments connected to such a node as RRH increases, more E-PDCCHs are assigned to a PRSCH region to raise the number of blind decodings that should be performed by a user equipment. Hence, the E-PDCCH may have a disadvantage in that complexity increases.

Meanwhile, in detail of E-PDCCH assignment scheme, there is an access scheme of attempting to reuse an existing R-PDCCH structure.

Figure 16:
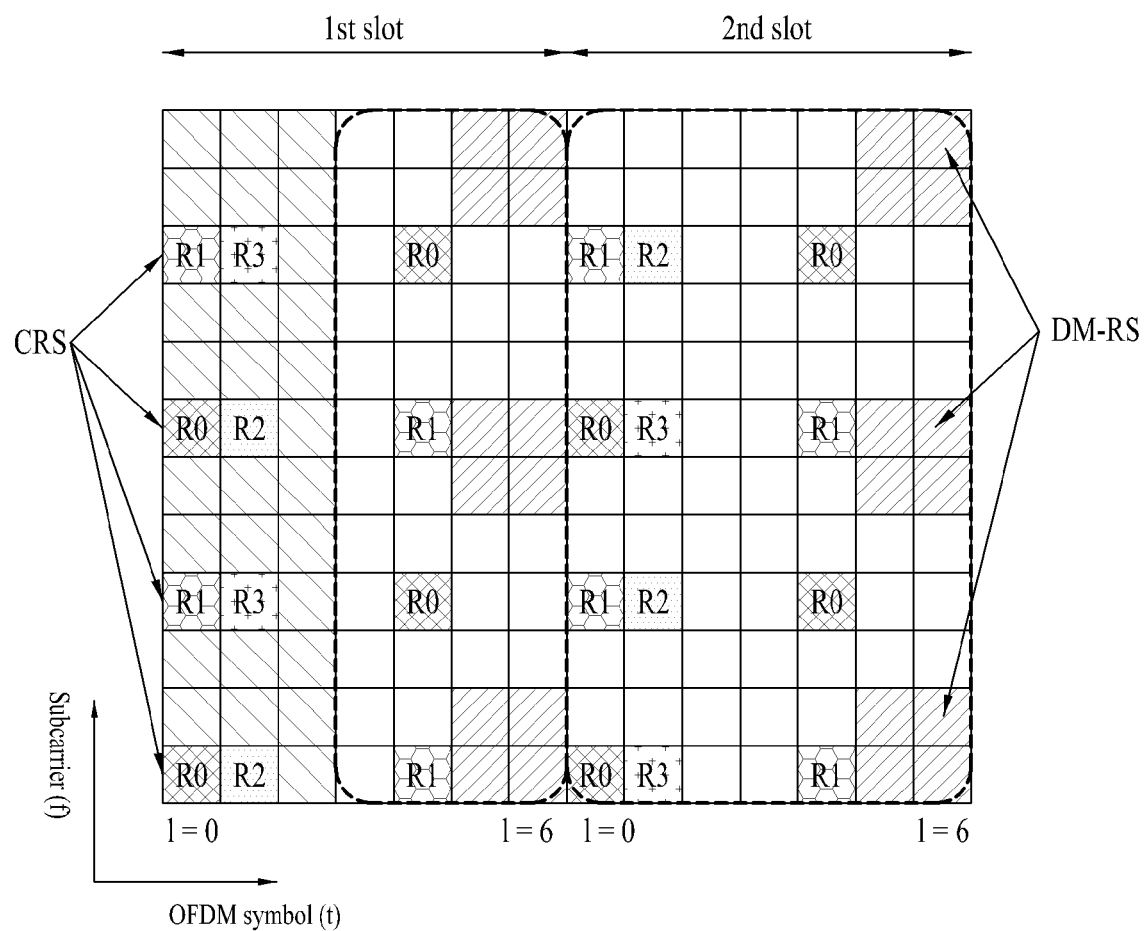
FIG. 16 is a diagram for one example of R-PDCCH transmitted to a relay node.

FIG. 16 is a diagram for one example of R-PDCCH transmitted to a relay node.

Referring to FIG. 16, a DL grant should be assigned to a $1^{st}$ slot only and a UL grant of a data PDSCH may be assigned to a $2^{nd}$ slot. In doing so, R-PDCCH is assigned to data RE except all of PDCCH region, CRS and DMRS. For R-PDCCH demodulation, both DM-RS and CRS are usable. In case of using DM-RS, a port 7 and 'scrambling ID (SCID)=0' are used.

On the other hand, when CRS is used, a port 0 is used only if there is a single PBCH transmitting antenna. If there are two or four PBCH transmitting antennas, a transmit diversity mode is entered and ports 0 and 1 and ports 0 to 3 are used all.

According to the present invention, when a user equipment decodes E-PDCCH with reference to the structure of R-PDCCH, a user equipment operation, which may occur due to a mismatch between the number of ports used for E-PDCCH decoding and the number of ports used for data transmission, is defined.

If an E-PDCCH design method exactly adopts an existing R-PDCCH structure, the port mismatch between PDCCH and PDSCH is an unavoidable effect. This is the problem basically caused when a new control channel (i.e., E-PDCCH) is additionally assigned not to an existing control region (e.g., PDCCH region) of LTE/LTE-A system but to a data region (e.g., PDSCH region). And, such a problem may be attributed to a difference between the number of layers assigned for each user equipment for E-PDCCH decoding and the number of layers assigned for data transmission.

Moreover, as a multi-node system is introduced, when an antenna port set usable for each node is given, there may occur an environment in which an antenna port configuration per user equipment differs.

Figure 17:
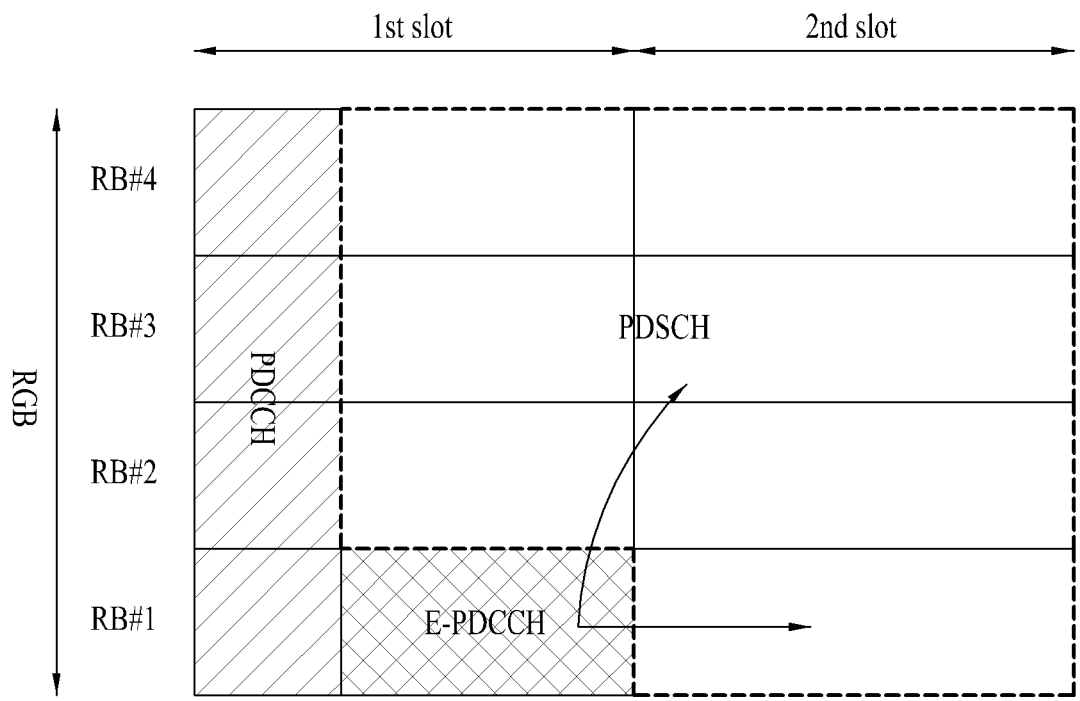
FIG. 17 is a diagram to describe a problem possibly caused by PDSCH assignment through E-PDCCH.

FIG. 17 is a diagram to describe a problem possibly caused by PDSCH assignment through E-PDCCH.

In particular, assume that 3 antenna ports $\{k_1, k_2, k_3\}$ are assigned to each of a user equipment A and a user equipment B in FIG. 17. A port actually usable for each user equipment may differ. In particular, even if two user equipments have the same antenna port number with the same layer or rank, the ports configured for the user equipment A may include the ports $\{7, 8, 9\}$ but the ports configured for the user equipment B may include the ports $\{7, 9, 10\}$. Thus, the configured ports may differ from each other depending on the accessed nodes.

In doing so, when E-PDCCH and PDSCH (i.e., a normal data channel) are assigned to the $1^{st}$ slot and $2^{nd}$ slot of RB like FIG. 17, respectively, if a user equipment uses two antenna ports, a used antenna port set becomes $\{k_1, k_2\}$. If DM-RS port #7 and DM-RS port #8 are used in decoding E-PDCCH and PDSCH of a user equipment, $k_1$ and $k_2$ may be set to the port #7 and the port #8, respectively [$\{k_1$=port #7, $k_2$=port #8$\}$].

If E-PDCCH basically refers to the structure of R-PDCCH as it is, the port number used for the decoding of the $1^{st}$ slot may differ from the port number used for the decoding of the $2^{nd}$ slot. In this case, the operation of the user equipment may be accompanied with the following problem.

First of all, a user equipment decodes E-PDCCH using an antenna port k1 (e.g., DM-RS port 7) and then acquires an information indicating that its data has been transmitted on a rank 2 (or 2 layers) through the obtained E-PDCCH. Hence, it can be observed that two antenna ports $\{k_1, k_2\}$ are used for the decoding of PDSCH in the $2^{nd}$ slot. In this case, the $k_1$ may be assumed as the DM-RS port 7 and the $k_2$ may be assumed as the DM-RS port 8. In doing so, the user equipment should perform a channel measurement by determining a presence or non-presence of the port $k_2$ in the $1^{St}$ slot of the RB #1 that carries the E-PDCCH. Generally, when a user equipment performs a channel measurement, it should perform a channel measurement on a whole assigned RBG not by a slot unit but by a PRB pair unit. Therefore, if an RS pattern available for each antenna port is different, a user equipment should perform a channel measurement differing for each antenna port.

Figure 18:
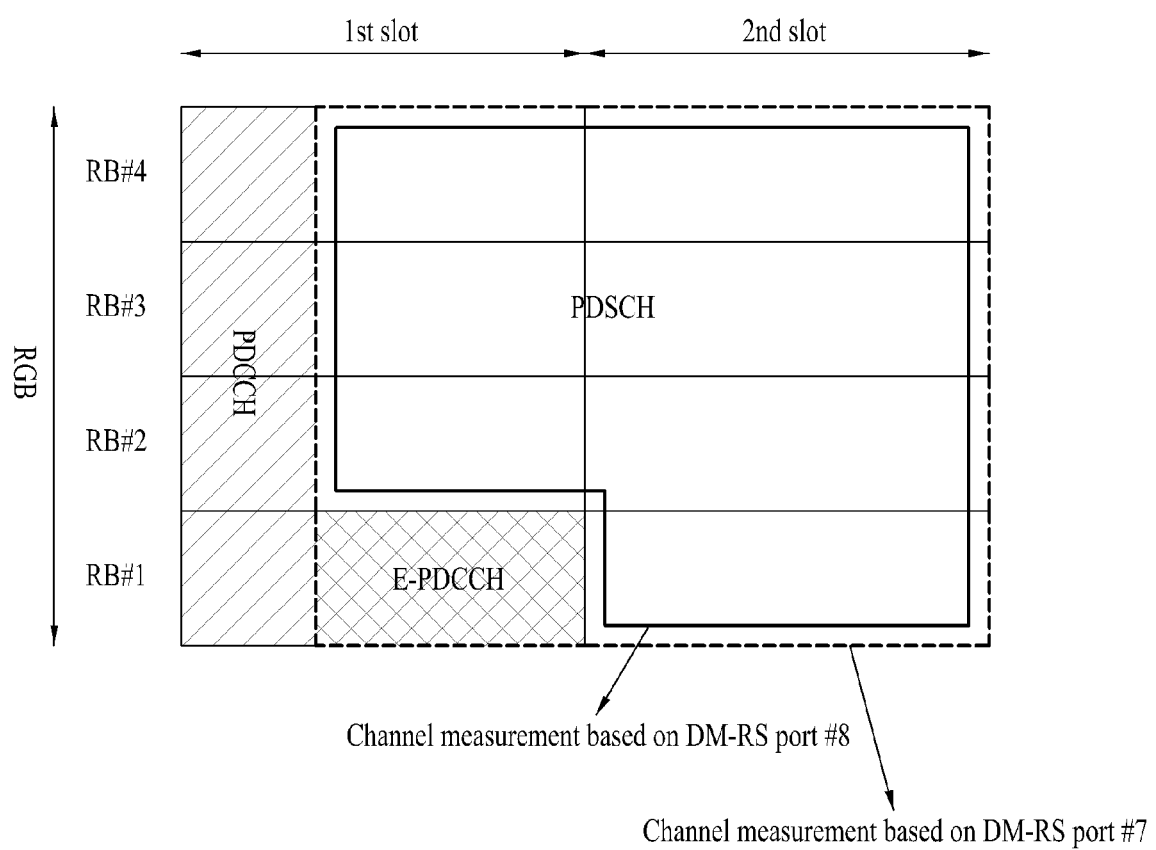
FIG. 18 is a diagram for one example of performing a different channel measurement per antenna port in case that an RS pattern available for each antenna port is different.

FIG. 18 is a diagram for one example of a method of measuring a channel configured different for an RBG assigned to a user equipment in case that DM-RS port $\{7\}$ and DM-RS ports $\{7, 8\}$ are set for E-PDCCH decoding and PRSCH decoding, respectively, when E-PDCCH and PDSCH differ from each other in port configuration.

Since the ports $\{k_1, k_2\}$ are used for a transmission of PDSCH, i.e., a data channel, it may be recognized that all RS of the antenna ports $\{k_1, k_2\}$ are used for a $1^{st}$ slot in which the E-PDCCH was transmitted. Yet, if the antenna port $k_1$ is set for a $1^{st}$ slot of RB #1 only, a channel measurement on the port $k_1$ and a channel measurement on the port $k_2$ should be performed differently. Hence, it is necessary to be provided with two kinds of channel measurers for the ports $\{k_1, k_2\}$, whereby implementation complexity of the user equipment may increase as well. On the other hand, a base station should perform an antenna port assignment for the user equipment in consideration of this situation.

In order to prevent the problem of increasing the implementation complexity of the user equipment, it is necessary to newly define operations of a user equipment for the above-mentioned situation. Therefore, according to the present invention, in case that the antenna port number for transmitting E-PDCCH is different from the antenna port number for transmitting PDSCH, operations of a user equipment are defined as follows.

1) First of all, a user equipment is proposed to operate on the assumption that DM-RS of a E-PDCCH transmitted region and DM-RS of a PDSCH transmitted region are transmitted from the same antenna port. In particular, since a user equipment is able to utilize a single channel measurement structure only, it performs a channel measurement on the assumption that the same antenna port exists in the E-PDCCH transmitted region. Moreover, since a channel measurement configuration of a user equipment has the same structure for each port, there is no increase of implementation complexity of the user equipment. If antenna ports used in the PDSCH region include $\{k_1, k_2, \ldots k_n\}$ in order to support such a user equipment operation, a base station transmits DM-RS from the ports $\{k_1, k_2, \ldots k_n\}$ in the E-PDCCH region as well.

2) Secondly, a base station informs a user equipment of antenna port configuration information on antenna ports for transmitting DM-RS in E-PDCCH region and PDSCH region. Subsequently, the user equipment operates in accordance with the corresponding information. If the user equipment receives the antenna port configuration information from the base station, when the user equipment performs PDSCH decoding, the user equipment can perform a channel measurement using DM-RS of the E-PDCCH region as well.

3) Finally, when E-PDCCH and PDSCH are transmitted from A antenna ports and B antenna ports, respectively, DM-RS corresponding to the B ports are preferable transmitted in E-PDCCH region as well. In particular, C of the B ports are set to become a portion (i.e., C<A) or all (i.e., C=A) of the E-PDCCH transmitted antenna ports. And, an information indicating whether DM-RS for the rest [i.e., (B-C) ports] are transmitted in the E-PDCCH region can be shared between a base station and a user equipment through E-PDCCH or upper layer signaling.

The above-mentioned proposal relates to E-PDCCH for example, by which the present invention may be non-limited. Moreover, when different kinds of control informations are transmitted by slot units like R-PDCCH, the present invention is applicable.

Figure 19:
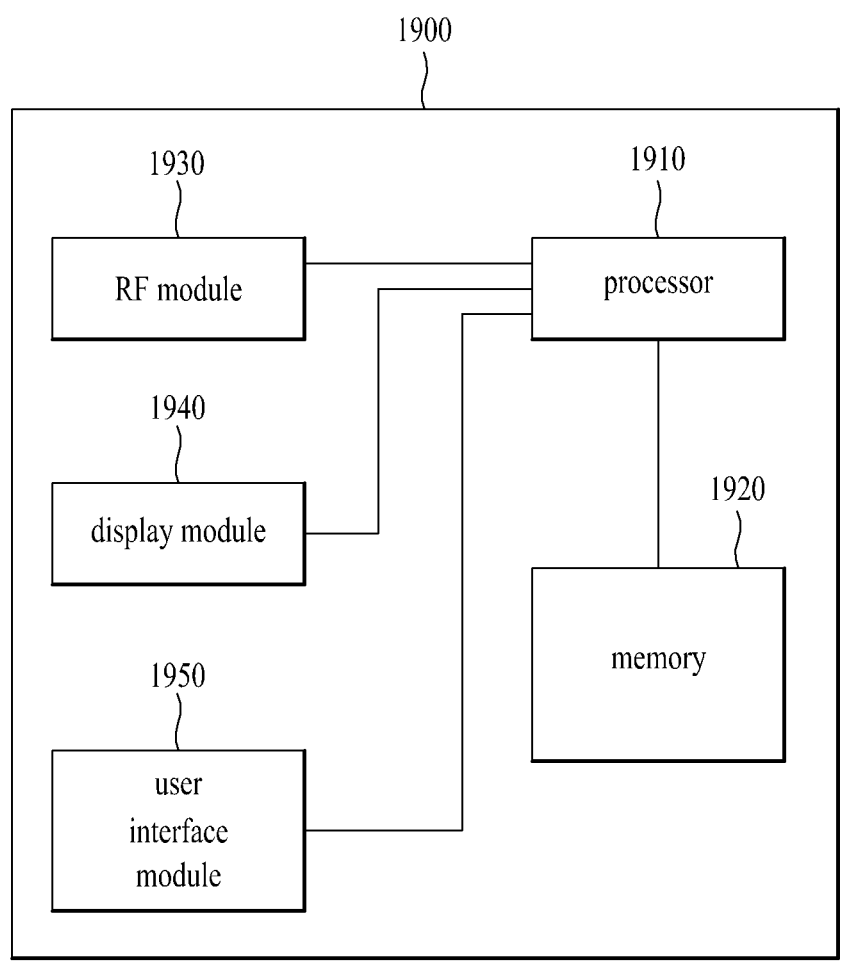
FIG. 19 is a block diagram for one example of a communication device according to one embodiment of the present invention.

FIG. 19 is a block diagram for one example of a communication device according to one embodiment of the present invention.

Referring to FIG. 19, a communication device 1900 includes a processor 1910, a memory 1920, an RF module 1930, a display module 1940 and a user interface module 1950.

The communication device 1900 is illustrated for clarity and convenience of the description and some modules can be omitted. Moreover, the communication device 1900 may further include at least one necessary module. And, some modules of the communication device 1900 can be further divided into sub-modules. The processor 1910 is configured to perform operations according to the embodiment of the present invention exemplarily described with reference to the accompanying drawings. In particular, the detailed operations of the processor 1910 can refer to the contents described with reference to FIGS. 1 to 18.

The memory 1920 is connected to the processor 1910 and stores an operating system, applications, program codes, data and the like. The RF module 1930 is connected to the processor 1910 and performs a function of converting a baseband signal to a radio signal or converting a radio signal to a baseband signal. To this end, the RF module 1930 performs analog conversion, amplification, filtering and frequency uplink transform or inverse processes thereof. The display module 1940 is connected to the processor 1910 and displays various kinds of informations. The display module 1940 can include such a well-known element as LCD (Liquid Crystal Display), LED (Light Emitting Diode), OLED (Organic Light Emitting Diode) and the like, by which the present invention is non-limited. The user interface module 1950 is connected to the processor 1910 and can include a combination of well-known interfaces including a keypad, a touchscreen and the like.

The above-described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of the appended claims or that those claims can be included as new claims by revision after filing an application.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method for a receiving end to perform a channel measurement in a wireless communication system and apparatus therefor are described mainly with reference to examples applied to 3GPP LTE system, as mentioned in the foregoing description, the present invention is applicable to various kinds of wireless communication systems as well as the 3GPP LTE system.

What is claimed is:

1. A method of receiving a downlink signal at a receiving end in a wireless communication system, the method comprising:
   receiving antenna port configuration information on at least one antenna port of a reference signal of a control channel and at least one antenna port of a reference signal of a data channel from a transmitting end;
   receiving the control channel based on the reference signal of the control channel;
   receiving the data channel based on the reference signal of the control channel and the reference signal of the data channel; and
   decoding the data channel using the antenna port configuration information by performing a channel measurement using the reference signal of the control channel,
   wherein the at least one antenna pan of the reference signal of the control channel is included in the at least one antenna port of the reference signal of the data channel.

2. The method according to claim 1, wherein the control channel is received in a $1^{st}$ slot of a subframe.

3. The method according to claim 2, wherein the data channel is received in a $2^{nd}$ slot of the subframe or in both of the $1^{st}$ slot and the $2^{nd}$ slot.

4. The method according to claim 1, receiving the data channel, comprising performing the channel measurement using the reference signal for the control channel and the reference signal for the data channel.

5. The method according to claim 1, wherein an antenna port number for transmitting the control channel is different from an antenna port number for transmitting the data channel.

6. The method according to claim 1, wherein the receiving end comprises a relay node and wherein the transmitting end comprises a base station.

7. A receiving apparatus in a wireless communication system, the receiving apparatus comprising:
   a wireless communication module configured to transceive a signal with a transmitting device; and
   a processor configured to process the signal,
   wherein the wireless communication module is further configured to receive antenna port configuration information on at least one antenna port of a reference signal of a control channel and at least one antenna port of a reference signal of a data channel from a transmitting end,
   wherein the processor is further configured to:
   control the wireless communication module to receive the control channel based on the reference signal of the control channel,
   receive the data channel based on the reference signal for the control channel and the reference signal of the data channel, and decode the data channel using the antenna port configuration information by performing a channel measurement using the reference signal of the control channel, and wherein the at least one antenna port of the reference signal of the control channel is included in the at least one antenna port of the reference signal of the data channel.

8. The receiving apparatus according to claim 7, wherein the control channel is received in a $1^{st}$ slot of a subframe.

9. The receiving apparatus according to claim 8, wherein the data channel is received in a $2^{nd}$ slot of the subframe or in both of the $1^{st}$ slot and the $2^{nd}$ slot.

10. The receiving apparatus according to claim 7, wherein the processor controls the wireless communication module to perform the channel measurement using the reference signal for the control channel and the reference signal for the data channel when receiving the data channel.

11. The receiving apparatus according to claim 7, wherein an antenna port number for transmitting the control channel is different from an antenna port number for transmitting the data channel.

12. The receiving apparatus according to claim 7, wherein the receiving apparatus comprises a relay node and wherein the transmitting device comprises a base station.

* * * * *